US009393166B2

(12) United States Patent
Albinmousa et al.

(10) Patent No.: US 9,393,166 B2
(45) Date of Patent: Jul. 19, 2016

(54) WHEELCHAIR SUSPENSION SYSTEM COMPRISING OF AN ENCASED SET OF SPRINGS WITH A DAMPER, AND METHOD FOR ENHANCING STABILITY

(71) Applicant: King Fahd University of Petroleum and Minerals, Dhahran (SA)

(72) Inventors: Jafar Husain Albinmousa, Dhahran (SA); Necar Merah, Dhahran (SA); Majed Abdullah Al-Shamrani, Dhahran (SA); Abdul-Iateef Saleh Al-Mutairi, Dhahran (SA); Yasser Mohammed Abduh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 289 days.

(21) Appl. No.: 14/133,740

(22) Filed: Dec. 19, 2013

(65) Prior Publication Data
US 2015/0173987 A1 Jun. 25, 2015

(51) Int. Cl.
*F16F 13/00* (2006.01)
*A61G 5/10* (2006.01)
*B60G 11/14* (2006.01)
*A61G 5/02* (2006.01)

(52) U.S. Cl.
CPC *A61G 5/10* (2013.01); *B60G 11/14* (2013.01); *A61G 5/02* (2013.01); *A61G 2005/1078* (2013.01); *B60G 2300/24* (2013.01)

(58) Field of Classification Search
CPC .......... B60G 3/01; B60G 11/14; B60G 15/07; B60G 15/065; B60G 2300/24; A61G 2005/1078; F16F 13/007
See application file for complete search history.

(56) References Cited

U.S. PATENT DOCUMENTS

| | | | | |
|---|---|---|---|---|
| 2,895,742 | A * | 7/1959 | Johnson | A61G 5/10 267/249 |
| 3,927,900 | A * | 12/1975 | Wischmeier | B60G 3/01 267/289 |
| 4,572,533 | A * | 2/1986 | Ellis | A61G 5/10 16/44 |
| 5,848,658 | A | 12/1998 | Pulver | |
| 5,855,387 | A * | 1/1999 | Gill | A61G 5/10 280/250.1 |
| 6,079,725 | A | 6/2000 | Lazaros | |
| 8,408,598 | B2 | 4/2013 | Mulhern et al. | |
| 8,746,383 | B2 * | 6/2014 | Basadzishvili | B60G 3/01 180/65.51 |
| 2007/0114754 | A1 * | 5/2007 | Santos, Jr. | A61G 5/10 280/304.1 |
| 2013/0106074 | A1 * | 5/2013 | Koku | B60G 3/01 280/124.127 |

FOREIGN PATENT DOCUMENTS

| | | |
|---|---|---|
| FR | 2 685 866 | 1/1992 |
| JP | 2003-79671 | 3/2003 |
| NL | 1017904 | 4/2001 |

* cited by examiner

*Primary Examiner* — Bradley King
(74) *Attorney, Agent, or Firm* — Oblon, McClelland, Maier & Neustadt, L.L.P

(57) ABSTRACT

A wheelchair suspension system which includes two springs with at least one damper and a central movable component that attaches to a wheel on a wheelchair. The damper is positioned in the center of at least one of the two springs and resists sudden force acting against the wheelchair with the two springs, the central movable component moves either in an upward or downward direction when there is force acting on it from both the springs and damper or by the uneven terrain. The wheelchair suspension apparatus will create greater stability for the entire wheelchair and increase the comfort of the user.

12 Claims, 7 Drawing Sheets

(illustration of the suspension apparatus and the wheelchair)

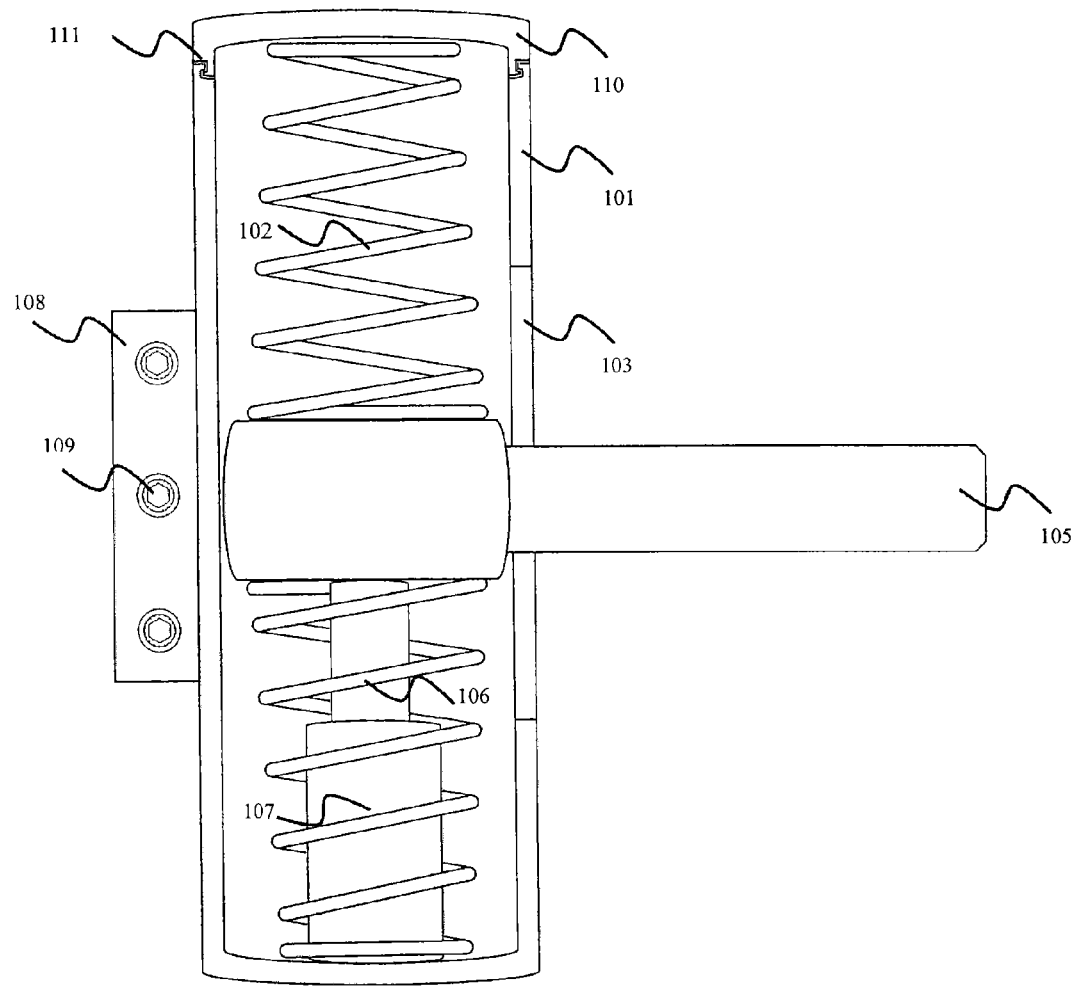
Fig. 1 (Side cross sectional view of the apparatus)

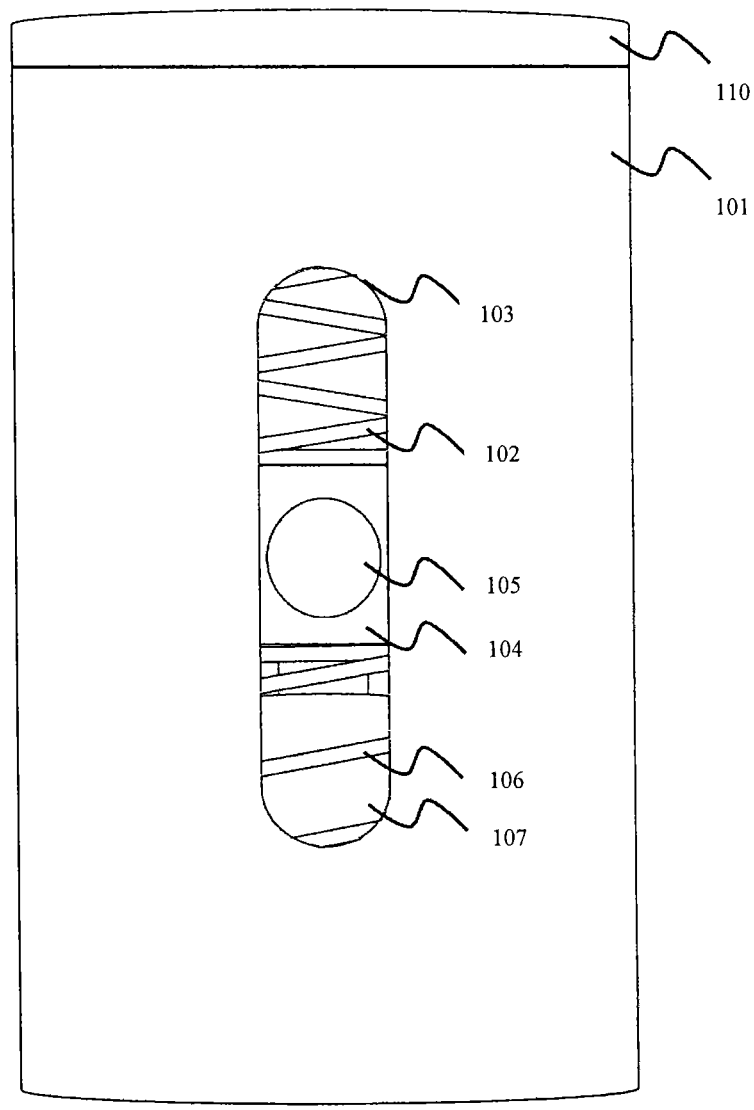
Fig. 2 (front view of the apparatus)

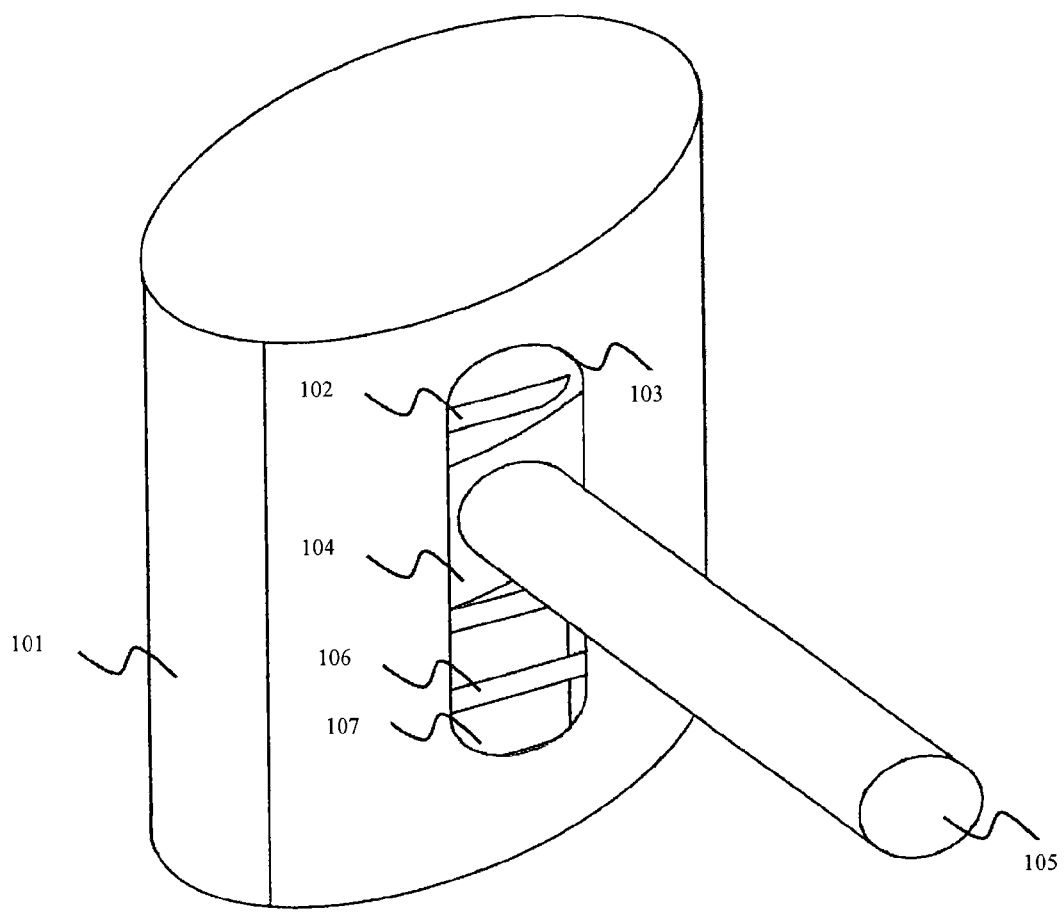
Fig. 3 (three dimensional view of the apparatus)

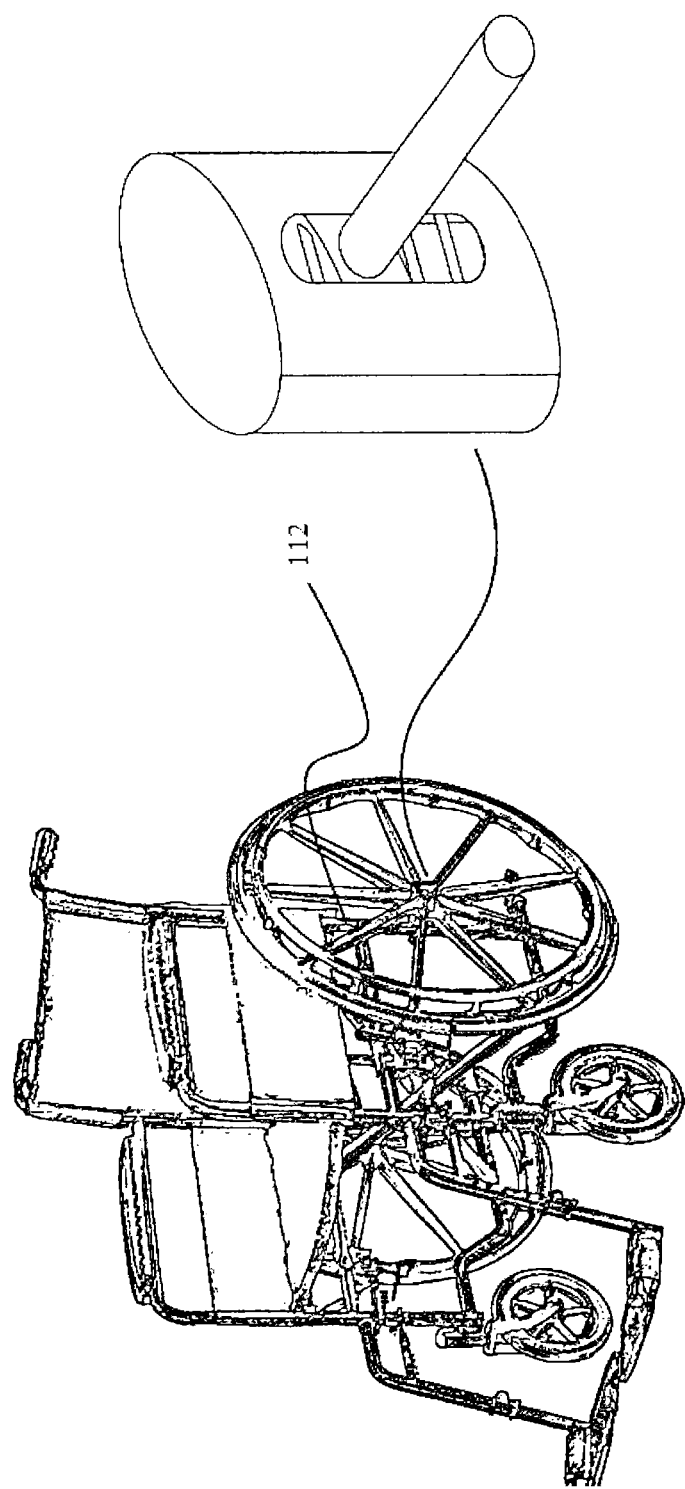
fig. 4 (illustration of the suspension apparatus and the wheelchair)

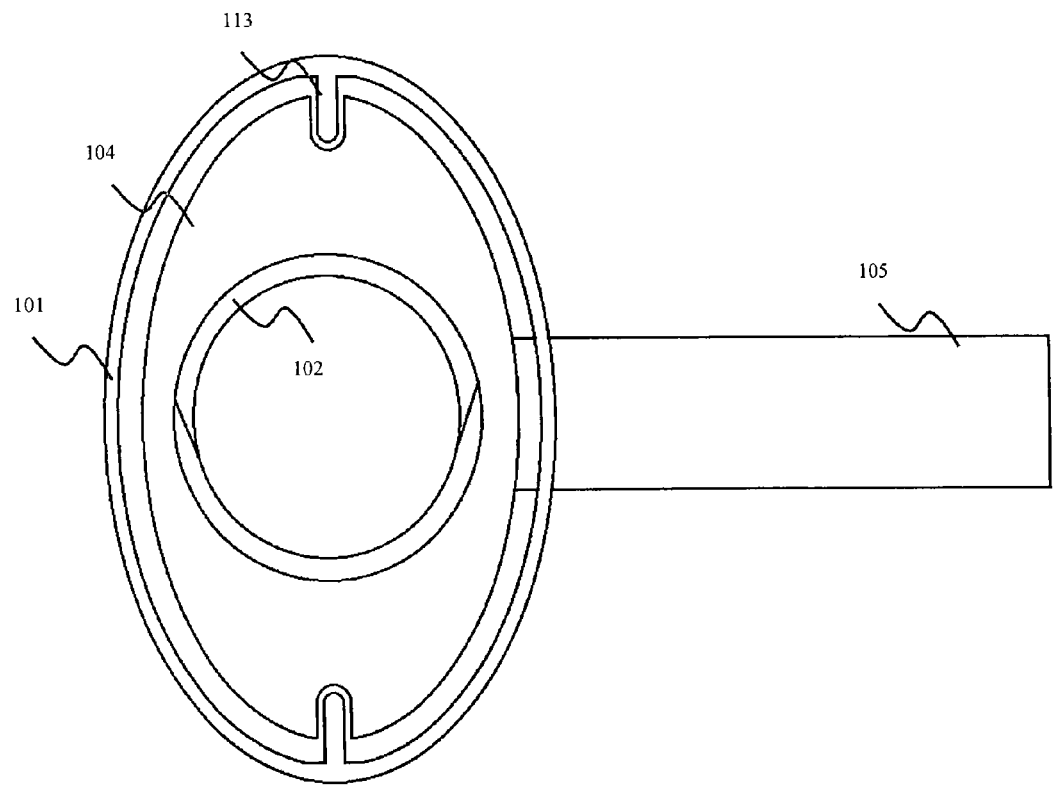
Fig. 5 (A top cross sectional view of suspension apparatus)

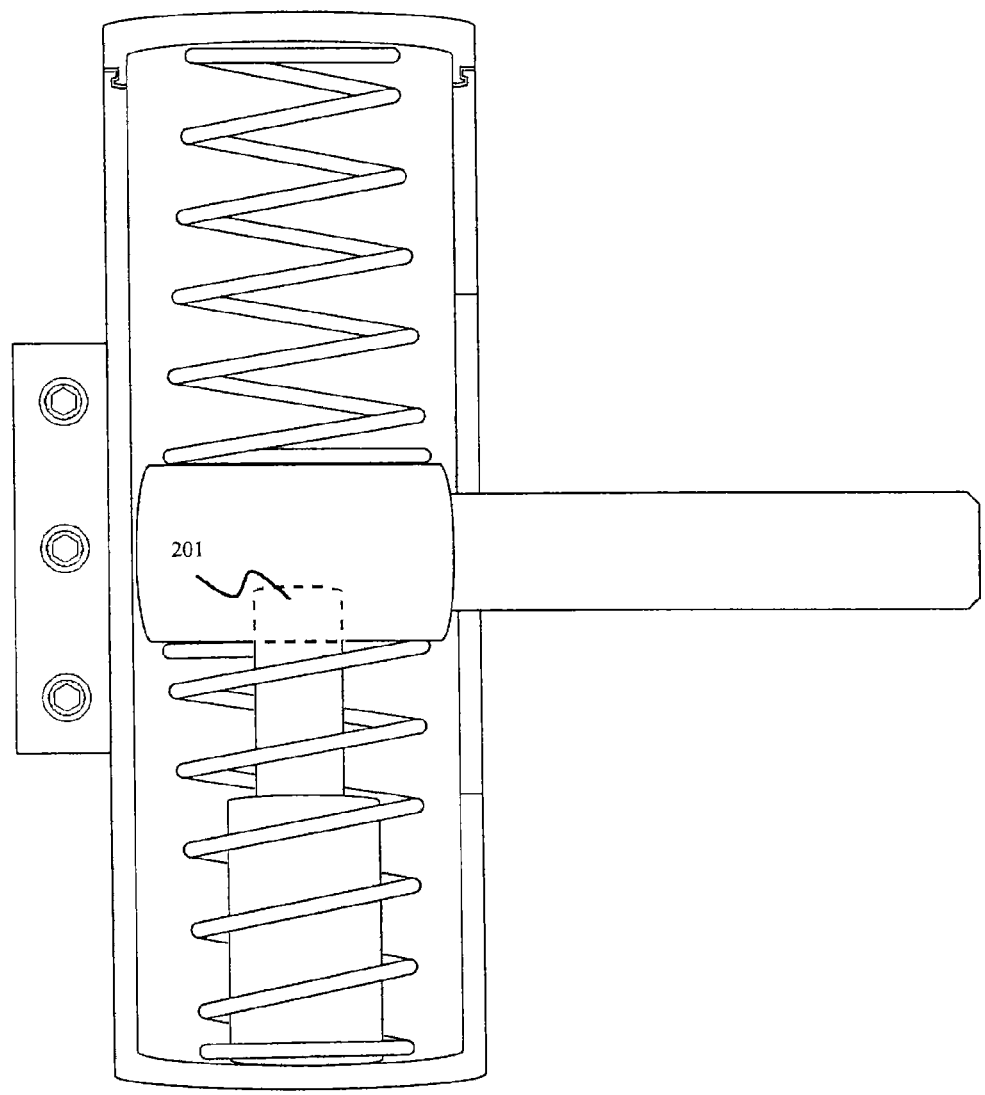
Fig. 6 (Side sectional view of a second alternative configuration of the apparatus)

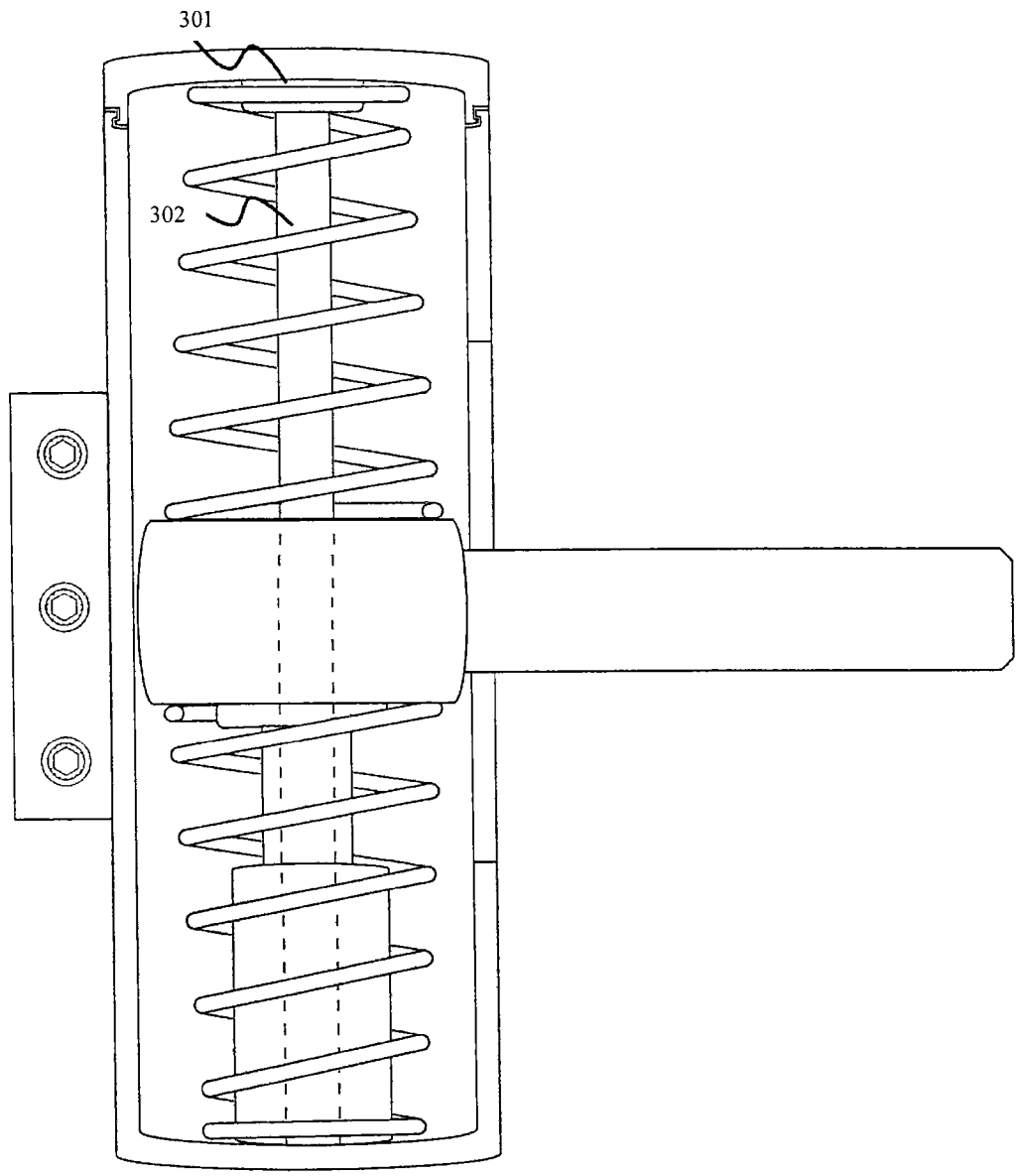
Fig. 7 (Side sectional view of a third alternative configuration of the apparatus)

WHEELCHAIR SUSPENSION SYSTEM COMPRISING OF AN ENCASED SET OF SPRINGS WITH A DAMPER, AND METHOD FOR ENHANCING STABILITY

BACKGROUND

1. Field of the Invention

This disclosure relates to a wheelchair suspension system, the easing of rough uncomfortable movements and the smoothness of travel when in motion.

2. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present invention.

Self-propelled or powered wheelchairs have vastly improved the mobility/transportability of the handicapped. The design of wheelchairs and their ease and comfort of use has been the subject of ongoing efforts. Wheelchair developers and users are continuously exploring ways to evolve the components, design and the overall use of the chair. As technology has evolved so has the design and mechanics of the wheelchair, the smoothness of travel while using the wheelchair is a particular and continuing concern for developers. Various technologies have emerged from the need to make the use of the wheelchair easier and more comfortable but substantial improvements are still needed. Suspension mechanisms placed in various positions on the wheelchair frame have proven to increase the comfort of travel by providing a smoother travel experience. The present invention will be described for exemplary purposes in conjunction with a frame and wheel of a wheelchair.

SUMMARY

Wheelchairs like other wheeled apparatuses such as bicycles, prams and road vehicles can encounter rough ground surfaces causing a bumpy journey. This disclosure describes a method and apparatus for providing a smoother experience for wheelchair users by installing a suspension mechanism into the frame of the wheelchair.

The disclosure includes a wheelchair having a mechanism comprising two springs with an attached movable center pivot situated in the middle of the springs; the springs are positioned upright with one positioned on top of the other.

In another aspect of the disclosure a damper is situated in the center of at least one of the springs.

In another aspect of the disclosure the damper is positioned at the protective casing end on one side and on the other to center a moveable component.

In another aspect of the disclosure the two springs, damper and the fixture are contained inside a protective outer case.

In another aspect of the disclosure the movable component in the center of the two springs named a Center Pivot has an extruding bar that connects to the center of the wheel for the wheelchair; the casing has a cutout section that allows the center component to move upwards or downwards when the wheelchair encounters bumps in its path.

In another aspect of the disclosure the assemblies of the components that make up the suspension apparatus can be positioned in a number of places on a wheelchair frame.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a cross sectional side view of the apparatus showing the inner mechanical components and the outer fittings.

FIG. 2 is a front view of the apparatus.

FIG. 3 is a 3 dimensional view of the mechanical apparatus.

FIG. 4 shows an example of an intended location for the apparatus to be fitted onto the frame of the wheelchair.

FIG. 5 is a top cross sectional view the suspension apparatus.

FIG. 6 is a cross sectional side view of the apparatus showing the inner mechanical components with an alternative second configuration.

FIG. 7 is a cross sectional side view of the apparatus showing the inner mechanical components with an alternative third configuration.

DETAILED DESCRIPTION OF THE EMBODIMENTS

Referring now to the drawings, wherein like reference numerals designate identical or corresponding parts throughout the several views, FIG. 1 is an illustrative view of the mechanical apparatus; it is a side sectional view that illustrates the internal components of the apparatus. It comprises of a hollow casing 101 that encapsulates a number of components in side of it, such as a center pivot 104 with an attached extruding bar 105 (which is also referred to as a "center bar"). Two springs one situated on top 102 and the other beneath 106 of the center pivot 104 keeping it positioned in the center of the apparatus. An exemplary manufactured material for the center pivot could be steal or aluminum that can be shaped by such a tool as a lathe or a drill. Keeping the center pivot in a fixed position is a damper 107, the damper is situated in the inside center of either the lower or upper spring 106. The damper is used to provide additional stability to the center pivot to help control the forces acting on it; the damper can be adjusted to stabilize the center pivot and soften any sudden forces acting on the wheel chair that may cause discomfort to the wheelchair user.

The extruding bar 105 attached to the center pivot 104 is for attaching to the wheel to the suspension apparatus. The bar 105 appears through a rectangular shaped cutout 103 of outer casing. The size and shape of the opening allows the bar to move upwards or downwards depending on the forces acting on the wheel.

On the back side of the mechanical apparatus is a shaft fixing 108 connected to the outer case. The fixing is meant for attaching the suspension apparatus to the frame of the wheelchair, the primary purpose of the shaft is to be able to attach the suspension apparatus to any standard wheelchair frame so that it becomes an easily fitted in component. 109 is an exemplary tapered and/or threaded end for the shaft for connecting the suspension apparatus to the frame of the wheelchair. The extruding bar 105 may use the same or a different method of connection to a wheel of the wheelchair. In one embodiment of the invention both the shaft fixing 109 and the extruding bar 105 have threaded connection means. In this depiction the connecting component is a tapered shaft that screws onto the wheelchair frame. However the suspension apparatus can be attached to the frame by a number of ways such as having clamps or bolts or by any type of connecting tool that attaches the suspension apparatus to the wheelchair frame.

The suspension apparatus should have a method for opening and placing or replacing internal components. FIG. 1 illustrates an exemplary method of having a detachable component to the casing of the apparatus 101; in this example the detachable component 110 resembles a 'lid' to the suspension apparatus. The detachable 'lid' component 110 seals all the separate internal components of the suspension apparatus inside the casing securely to ensure that the suspension apparatus functions correctly. 111 demonstrates a method of attaching the lid component to the suspension apparatus casing, the illustration does not show an exact method of attaching the lid component to the apparatus casing, the illustration is non-limiting and can be interpreted in a number of ways, such as a detachable 'screw on' component, or 'clip on' or it could be 'bolted on' by external clips. The detachable component is not limited to any place or position on the suspension apparatus, nor is limited to any method of attaching or detaching from the apparatus casing.

When the wheels of the wheelchair encounter bumps on rough or uneven terrain the extruding bar 105 attached to the wheel is forced upward. As the bar goes up the internal lower spring expands and the internal top spring of the suspension apparatus compresses allowing the bar to move and balance and stabilize the forces acting upon it.

When the wheelchair encounters a rough surface the suspension apparatus will absorb much of the impact that would otherwise be transferred directly to the wheelchair frame and the user would therefore have a much smoother experience while using the wheelchair. As the center pivot of the suspension system moves upward and downward the stability of the wheelchair frame increases as the springs and the dampers absorb much of the forces acting upon the entire structure. In a non-binding or limiting description the spring mechanism can have a graded threshold whereby the spring mechanism's strength gradually gets stronger after an amount of force has been exerted onto it and it is compressed beyond a certain point. The spring is not limited to any particular type; it can be helical, tension/extension spring, feather spring, variable spring, coil spring or any tension stabilizing type of spring. The springs can be fixed to the inside ends of the embodiment casing and to the center pivot or loosely placed inside the casing.

In the center of at least one or both suspension springs is a damper, the damper can be a dashpot, a shock absorber or any type of damper that resists motion via viscous friction or electromagnetic resistance. It can be placed in the center of either the lower or upper spring or both. The dampers absorb the sudden forces acting on the chair lessening the amount of movement on the frame of the chair.

The center pivot should have the durability to endure the forces that will come from the wheel through the connecting bar. The center pivot that is balanced between the two springs moves up and down in the casing; the pivot component is sturdy and keeps the extruding bar from twisting out of a 90 degrees angle from the front of the embodiment. Therefore the shapes of the pivot inside of the embodiment, the connection between the center pivot 104 and the extruding bar 105 and the shape of the case cut out 103 are calibrated in such a way that the wheel connected to the embodiment remains straight alignment.

The extruding bar goes through the center of the wheel and attaches it to the embodiment. The method of attaching the wheel to the extruding bar can be but not limited to an attachable bolt at the end of the bar that prevents the wheel sliding off the end, another method could be by having a flush fitted tube inside the wheel center with a screw in the end that can be twisted to the end of the extruding bar.

The casing of the embodiment that is of a durable solid material can be but not limited to a tubular, a cylindrical, a rectangular, a cubed or any other shape that allows all of the functions of the embodiment to work.

On the reverse side of the embodiment is a fixture that allows the suspension apparatus to connect to the frame of the wheel chair. The method of attaching the embodiment can be but not limited to a diagonal or vertical component or one that is adjustable into a position or direction and fixes onto the frame by method screws and bolts or clamps or by any other method of firmly fixing the suspension apparatus to the wheelchair frame.

FIG. 2 shows a front view of the suspension apparatus, the opening rectangular shaped hole 103 for the extruding bar to pass through is not limited to any diameter or length, the ends of the cutouts can be round, square, triangular or hexagonal shaped depending on the requirements of the application.

Also the extruding bar 105 from the center pivot 104 to the middle of the wheel is not limited to the size of diameter or shape. The shape of the bar can be rounded, square, triangular or hexagonal shaped depending on the requirements of the application. The extruding bar ends can be tapered in any of the following shapes; rounded, square, triangular or hexagonal shaped for such purposes as fixings or aesthetics.

FIG. 3 is an illustration of the embodiment from a three dimensional point of view, it shows the top and sides of the suspension apparatus. It shows the positioning of the outer components of the apparatus and gives a perspective view of the proportions of the different of the different parts.

FIG. 4 shows the suspension apparatus and a graphic illustration of a wheelchair. 112 indicate the frame of the wheelchair and the graphic shows the proposed position of where the suspension may go on a wheelchair of this particular design. The suspension apparatus will attach to the frame of the wheelchair in accordance with the size and height of the wheel in order for the apparatus to function as best it can for its purpose.

FIG. 5 is a cross sectional view from above the suspension apparatus; in it is a proposed optional feature of having additional support for the center pivot component to enhance its stability when being used. On the inside of the protective casing of the suspension apparatus is two indented pieces of metal 113, they act as guides for the center pivot. As the center pivot 104 has the same indented shape but in reverse cut out of it, the indented metal 113 guides the center pivot component along its path when forces from uneven ground causes it to move.

FIG. 6 also depicts another alternative configuration for the suspension apparatus. This configuration's distinct feature is a central support component that is fixed in the middle of the apparatus; it extends through the center from the bottom base to the top of the internal suspension apparatus. The central support component in this example resembles a rod; it supports and increases the stability and functionality of the internal components. For this configuration the damper would have a hollow center to allow the center support bar through it or there would be a fixed base for the damper and can attach to the support bar in such a way that the moving parts of the damper are not restricted.

The support bar would extend through the center pivot and would connect to the upper inner section of the suspension apparatus. The support bar would help the center pivot's stability; it would help it avoid twisting or turning adding greater sturdiness to the suspension apparatus and to the wheelchair as a whole.

It is to be understood that the unique suspension system of the present invention can be incorporated into both a folding or non-folding wheelchair and the description of the suspension system in conjunction with a frame and wheel of a wheelchair is not intended to be limiting. The invention depicting a suspension mechanism consisting of two springs with a center moveable component (named the center pivot) attached to an extruding bar in the middle of the two springs. The components include at least one damper inside one of the springs which are all concealed in a protective case, fitted on or into the frame of the chair to provide a smoother and more comforting journey for the traveler.

The invention claimed is:

1. A wheelchair suspension system, comprising:
   a top spring and a bottom spring placed inside a protective case with a center bar that is connected to a center pivot and extrudes out through a gap in the protective case to a wheel of a wheelchair;
   a damper fitted in the middle along an expansion and compression axis of at least one of the top and the bottom springs inside the protective case placed in the center of either the top spring or the lower spring;
   a first fixture placed on the reverse side of the protective case allowing the fixture to attach to a frame of the wheelchair.

2. The wheelchair suspension system in claim 1, wherein; at least one of the top spring and the bottom spring has a variance stress tolerance whereby the strength of the spring increases in response to an increase in force exerted onto the spring.

3. The wheelchair suspension system in claim 1, wherein; the center pivot is positioned in the middle of at least one of the top spring and the bottom spring to provide stability to the center bar at a 90 degree angle from the protective casing.

4. The wheelchair suspension system in claim 1, wherein; the first fixture is configured to attach to the frame of the wheelchair by a tapered and/or threaded shaft.

5. The wheelchair suspension system in claim 1, wherein; the damper is any of a dashpot, a shock absorber, an electromagnetic resistance device or a damper that resists motion via viscous friction.

6. The wheelchair suspension system in claim 1, further comprising:
   an outer casing surrounding the protective case, where the outer casing is made from a durable solid material selected from the group consisting of a metal, a plastic, wood and carbon fiber.

7. The wheelchair suspension system in claim 2, wherein; at least one of the center bar and the center pivot is balanced between the top spring and the bottom spring and acts to stabilize the forces acting on the wheel and the wheelchair frame.

8. The wheelchair suspension system in claim 3, wherein; at least one of the top spring and bottom spring is selected from the groups consisting of a helical spring, a tension/extension spring, a variable spring, a coil spring and a tension stabilizing spring.

9. The wheelchair suspension system in claim 3, further comprising:
   a second fixture that is present on the center bar for connecting a wheel onto the wheelchair suspension system.

10. The wheelchair suspension system in claim 9, wherein the second fixture is configured to connect the wheel onto the wheelchair suspension system by a tapered and/or threaded shaft.

11. The wheelchair suspension system in claim 1, wherein the protective case has a detachable lid that seals the top spring, the bottom spring, the center pivot attached to the center bar, and the damper inside the protective case.

12. The wheelchair suspension system in claim 1, wherein the protective case has indented metal guides adapted to guide the center pivot along the expansion and compression axis of the top and the bottom springs.

\* \* \* \* \*